United States Patent [19]

Saito et al.

[11] Patent Number: 5,286,688
[45] Date of Patent: Feb. 15, 1994

[54] RARE EARTH OXIDE POWDER

[75] Inventors: Fumihiko Saito; Yuji Kimura; Norifumi Yoshida, all of Fukui, Japan

[73] Assignee: Shin-Etsu Chemical Co., Ltd., Tokyo, Japan

[21] Appl. No.: 69,685

[22] Filed: May 28, 1993

[30] Foreign Application Priority Data

May 28, 1992 [JP] Japan .................. 4-162021

[51] Int. Cl.$^5$ .................. C04B 35/50; C04B 35/51
[52] U.S. Cl. .................. 501/152
[58] Field of Search .................. 501/152

[56] References Cited

U.S. PATENT DOCUMENTS

| | | | |
|---|---|---|---|
| 3,108,887 | 10/1963 | Lenie et al. | 501/152 |
| 3,185,652 | 5/1965 | Kleber et al. | 501/152 |
| 4,292,081 | 9/1981 | Watanabe et al. | 501/152 |
| 4,755,492 | 7/1988 | Greskovich et al. | 501/152 |
| 5,017,532 | 5/1991 | Sonnenberg et al. | 501/152 |
| 5,061,560 | 10/1991 | Tajima et al. | 501/152 |
| 5,082,810 | 1/1992 | Bergna et al. | 501/152 |

*Primary Examiner*—Mark L. Bell
*Assistant Examiner*—Deborah Jones
*Attorney, Agent, or Firm*—Wenderoth, Lind & Ponack

[57] ABSTRACT

Proposed is a green ceramic body prepared from an aqueous slurry of a rare earth oxide powder capable of giving an aqueous slurry having greatly improved stability of the aqueous slurry thereof in respect of the consistency over a long period. The improved rare earth oxide powder can be prepared by: (a) blending a rare earth oxide powder with a flux composition which is, for example, a combination of a boron oxide constituent and an oxide, carbonate or chloride of an alkali metal or alkaline earth metal element in an amount in the range from 0.1 to 5% by weight based on the rare earth oxide powder to give a uniform blend; (b) calcining the blend at a temperature of 1200° to 1400° C. for 0.5 to 24 hours; (c) cooling the calcined blend to room temperature to give a semi-sintered mass; (d) disintegrating the semi-sintered mass into a powdery form hav-ing a specific surface area not exceeding 3 m$^2$/g; and (e) subjecting the powder to a leaching treatment with water to remove any water-soluble fraction of the flux composition.

3 Claims, No Drawings

RARE EARTH OXIDE POWDER

BACKGROUND OF THE INVENTION

The present invention relates to a powder of a rare earth oxide or, more particularly, to a powder of a rare earth oxide capable of giving greatly increased stability to the consistency of an aqueous slurry of the powder for shaping or molding of a green ceramic body as well as to a method for the preparation of such an improved rare earth oxide powder as well as a green ceramic body shaped from such a rare earth oxide powder.

As is well known, rare earth oxide powders are widely used as a material of various kinds of ceramic articles such as crucibles, base plates used in a high-temperature treatment of other articles as well as a coating material of various kinds of ceramic articles by virtue of the very excellent properties thereof as a refractory material. When a rare earth oxide powder is used in these applications, a procedure which is undertaken almost always is that the rare earth oxide powder is blended with and dispersed in a certain volume of water to make a slurry of the powder having an adequate consistency depending on the particular method for shaping or molding of a green ceramic body or for coating to form a covering layer on a substrate ceramic body.

A serious problem in such an aqueous slurry of a rare earth oxide powder is that aqueous slurries of a rare earth oxide powder are usually unstable in the consistency in the lapse of time to cause an increase of the consistency within a relatively short time due to the reactivity of the rare earth oxide particles with water. Accordingly, it is necessary in the prior art that an aqueous slurry of a rare earth oxide powder is prepared immediately before each time of the use of the slurry for shaping green ceramic bodies or before the use of the slurry as a coating material. This problem can of course be mitigated by decreasing the content of the rare earth oxide powder in the aqueous slurry or by admixing the aqueous medium of the slurry with a water-miscible organic solvent. The former method is of course not practical because of the decrease in the productivity of the manufacturing process of rare earth oxide-based ceramics if not to mention that certain molding methods cannot be applied to an aqueous slurry of such a decreased content of the oxide powder. The latter method is also not practical because the use of an organic solvent always involves problems relative to the health and safety of workers and environmental pollution caused by the waste water containing an organic solvent if not to mention an increase in the costs for the dispersion medium.

SUMMARY OF THE INVENTION

The present invention accordingly has an object to provide a novel rare earth oxide powder capable of giving an aqueous slurry having greatly improved stability over a long period of standing even when the content of the oxide powder in the slurry is high enough to be used as a molding material of a green ceramic body or as a coating material without being accompanied by the above mentioned disadvantages in the prior art as well as to provide a green ceramic body shaped from such an improved rare earth oxide powder.

Thus, the invention provides a rare earth oxide powder of which each particle has a coating layer of a flux composition consisting of a combination of a boron oxide constituent and an oxide, carbonate or chloride or, preferably, oxide of an alkali metal or alkaline earth metal element or, alternatively, a borate of an alkali metal or alkaline earth metal element, the powder preferably having a specific surface area not exceeding 3 $m^2/g$.

Such a rare earth oxide powder of surface-coated particles can be prepared by a method which comprises the steps of:

(a) blending a rare earth oxide powder with a flux composition which is a combination of a boron oxide constituent and an oxide, carbonate or chloride of an alkali metal or alkaline earth metal element or, alternatively, a borate of an alkali metal or alkaline earth metal element in an amount in the range from 0.1 to 5% by weight based on the amount of the rare earth oxide powder to give a uniform blend;

(b) calcining the blend at a temperature in the range from 1000° to 1500° C. or, preferably, from 1200° to 1400° C. for a length of time in the range from 0.5 to 24 hours;

(c) cooling the calcined blend to room temperature to give a semi-sintered mass;

(d) disintegrating the semi-sintered mass into a powdery form having a specific surface area not exceeding 3 $m^2/g$; and (e) subjecting the powder to a leaching treatment with water to remove any water-soluble fraction of the flux composition.

The above defined rare earth oxide powder of surface-coated particles can be advantageously used in the preparation of an aqueous slurry having greatly improved stability relative to the consistency by dispersing in an aqueous medium even when the content of the rare earth oxide powder in the slurry exceeds 80 parts by weight per 100 parts by weight of the aqueous medium so that the aqueous slurry can be used in the preparation of green ceramic bodies by various molding methods or as a coating material with high productivity.

DETAILED DESCRIPTION OF THE PREFERRED EMBODIMENTS

As is described above, the rare earth oxide powder of the invention is characterized in that each of the particles thereof is coated with a specific flux composition and the powder has a specific surface area not exceeding 3 $m^2/g$. Such an improved rare earth oxide powder can be obtained by the above defined method.

The starting rare earth oxide powder, from which the above defined surface-coated particles are prepared is not particularly limitative relative to the kind of the rare earth element including yttrium and the elements having an atomic number in the range from 57 to 71 inclusive. The oxides of these rare earth elements can be used either singly or as a combination of two kinds or more according to need in any desired proportion.

The flux composition by which the particles of the rare earth oxide powder are coated, on one hand, can be a combination of a boron oxide constituent and a metallic compound selected from the group consisting of oxides, carbonates and chlorides or, preferably, oxides of an alkali metal element, e.g., lithium, sodium, potassium, rubidium and cesium, or an alkaline earth metal element, e.g., magnesium, calcium, strontium and barium. Taking calcium as an example, the metallic compound to be combined with the boron oxide constituent can be calcium oxide, calcium carbonate or calcium chloride. The other essential ingredient in the flux composition is a boron oxide constituent which can be boron oxide $B_2O_3$ or ammonium borate. The amounts of the alkali or alkaline earth metal compound and the boron oxide compound are in the range from 0.05 to 5.0% by weight and from 0.01 to 1.0% by weight, respectively, based on the amount of the rare earth oxide powder. Alternatively, the flux composition can be a borate of an alkali metal or alkaline earth metal element such as sodium borate, lithium tetraborate and the like.

The amount of the above described flux composition as a total in the inventive surface-treated rare earth oxide particles relative to the rare earth oxide powder before treatment is in the range from 0.1 to 5% by weight or, preferably, from 0.5 to 3% by weight. The stability of an aqueous slurry of the inventive surface-treated rare earth oxide powder can be improved only when the amount of the flux composition is in the above mentioned range.

Following is a description of the procedure for the surface treatment of the rare earth oxide particles with the flux composition. Thus, the rare earth oxide powder and the flux composition are uniformly blended together in the above specified weight proportion and the blend was calcined in a crucible of a suitable refractory material such as alumina at a temperature in the range from 1000° to 1500° C. or, preferably, from 1200° to 1400° C. in air for a length of time of 0.5 to 24 hours followed by cooling so as to give a semi-sintered mass which is then disintegrated in a wet process, for example, using a ball mill. The powder thus obtained is then washed or leached with water so as to dissolve away the excess water-soluble fraction of the flux composition, if any, followed by drying. The flux composition subjected to the calcination treatment in a blend with the rare earth oxide powder is mostly converted into a glassy form by the reaction with the rare earth oxide particles so that the surface of the particles is covered with a covering layer of the molten flux composition or the vitrified composition. It is noted that the flux composition not only forms a glassy coating layer on the rare earth oxide particles but also at least partly reacts with the rare earth oxide so that the coating layer thus formed contains a small amount of the rare earth element depending on the conditions of calcination. The above mentioned washing or leaching of the calcined and disintegrated material with water should be as complete as possible since a remaining amount of the water-soluble fraction of the flux composition is responsible for decreasing the stability of the aqueous slurry prepared by dispersing the powder in an aqueous medium.

When the surface-treated rare earth oxide particles of the invention are to be used in the form of an aqueous slurry as a material for the preparation of ceramic articles, it is preferable that the specific surface area of the powder is not too large because an aqueous slurry of too fine particles is subject to a relatively early increase of the consistency as a consequence of the increased reactivity. In this regard, the earth oxide powder after the surface treatment should have a specific surface area not exceeding 3.0 $m^2/g$ or, preferably, not exceeding 2.5 $m^2/g$. The specific surface area of the powder can be conveniently determined by using an instrument therefor manufactured and sold by Micromeritex Co. (Model Flowsorb 2300).

When the rare earth oxide powder after the surface treatment according to the invention is slurried with thorough agitation in an aqueous medium, the slurry is very stable in respect of the consistency and is free from settling of the particles therefrom over a quite long period of time even when the content of the oxide powder in the slurry is so high as to exceed 80 parts by weight per 100 parts by weight of water or an aqueous dispersion medium.

By virtue of the outstanding stability in consistency, the aqueous slurry of the inventive rare earth oxide powder can be used as such in shaping of a ceramic green body by the method of slip casting and the like and as a coating agent on other ceramic bodies by using a doctor blade or by the dipping method. If adequate, the stability of the aqueous slurry can be further improved by the addition of a binder such as a water-soluble polymeric material, e.g., sodium alginate and water-soluble cellulose ethers, silica sol and the like. As a slurry for shaping ceramic materials, the aqueous slurry should contain from 80 to 500 parts by weight of the inventive rare earth oxide powder per 100 parts by weight of water or an aqueous medium. When the solid content of the aqueous slurry is too low, no uniformity can be ensured in the shaped ceramic body or the thickness of the ceramic coating layer is unduly small.

The pot life or usable duration of an aqueous slurry of the inventive rare earth oxide powder can be estimated by periodically measuring the consistency or viscosity of the slurry to find an end point beyond which troubles may be caused in shaping green ceramic bodies or ceramic coating layers by the respective methods. In the following experiments, the aqueous slurry was kept standing at 22° C. with periodical stirring at 24 hours intervals and the viscosity thereof was measured by using a Brookfield viscosimeter immediately after stirring to disperse the sediment, if any, on the vessel bottom along with test preparation of a ceramic green body. When the slurried condition could no longer be regained even by stirring, the length of time up to the moment was taken as the serviceable life of the slurry.

In the following, some embodiments of the present invention are described in more detail by way of examples, which, however, never limit the scope of the invention in any way.

EXAMPLE 1

A powder blend was prepared by using a pestle and mortar from 100 g of a yttrium oxide powder, 2.0 g of barium oxide and 0.1 g of boron oxide and calcined in an alumina crucible by heating in air at 1300° C. for 4 hours. The thus obtained semi-sintered mass of the powder blend was crushed in a mortar and then disintegrated in a ball mill with water to give a powder which was washed with 1000 ml of water, filtrated and dried by heating at 100° C. for 6 hours. The yttrium oxide powder after the above described treatment had a specific surface area of 0.6 $m^2/g$.

Aqueous slurries were prepared by thoroughly dispersing the above obtained yttrium oxide powder in an equal amount of water or in a half amount of water. The aqueous slurries as prepared had a viscosity of 40 centipoise and 100 centipoise, respectively, which values could be persistently maintained over 60 days or even longer.

For comparison, 150 g of the same yttrium oxide powder before the surface treatment were dispersed in 100 g of water to give an aqueous slurry, which was found to have been gelled after 2 days of standing as such. For further comparison, 200 g of the same yttrium oxide powder were thoroughly agitated in 100 g of water but no stable slurried dispersion could be obtained with settling of the powder within a short time.

Another aqueous slurry was prepared by dispersing 200 g of the same yttrium oxide powder after the surface treatment in 100 g of water together with 2 g of sodium alginate to find that the slurry as prepared had a viscosity of 100 centipoise. After 5 days of standing to confirm stability of the viscosity, the slurry was again thoroughly agitated and used for shaping of a ceramic green body in the form of a plate by the slip casting method and the green body after drying was sintered at 1700° C. for 10 hours to give a uniform sintered plate of yttrium oxide.

EXAMPLE 2

A powder blend was prepared by using a pestle and mortar from 100 g of a yttrium oxide powder, 1.0 g of barium oxide, 0.5 g of sodium carbonate and 0.1 g of boron oxide and calcined in an alumina crucible by heating in air at 1300° C. for 4 hours. The thus obtained semi-sintered mass of the powder blend was crushed in a mortar and then disintegrated in a ball mill with water to give a powder which was washed with 1000 ml of water, filtrated and dried by heating at 100° C. for 6 hours. The yttrium oxide powder after the above described treatment had a specific surface area of 2.2 $m^2/g$.

Aqueous slurries were prepared by thoroughly dispersing the above obtained yttrium oxide powder in an equal amount of water or in a half amount of water. The slurries as prepared has a viscosity of 50 centipoise and 100 centipoise, respectively, which values could be persistently maintained over 60 days or even longer.

Another aqueous slurry was prepared by dispersing 100 g of the same yttrium oxide powder after the surface treatment in 100 g of water together with 3 g of methyl cellulose to find that the slurry as prepared has a viscosity of 80 centipoise. After 10 days of standing to confirm stability of the viscosity, the slurry was again thoroughly agitated and used for forming a ceramic coating layer of 0.2 mm thickness as dried on a sintered body of yttrium oxide prepared in advance. The sintered yttrium oxide body having been coated with the slurry and dried at 50° C. for 8 hours was subjected to sintering at 1700° C. for 10 hours. The thus obtained surface-coated sintered body of yttrium oxide was examined for the cross section to detect absolutely no demarcation line between the coating layer and the underlying body surface.

EXAMPLE 3

A powder blend was prepared by using a pestle and mortar from 100 g of a gadolinium oxide powder, 1.0 g of barium oxide, 0.5 g of sodium carbonate and 0.1 g of boron oxide and calcined in an alumina crucible by heating in air at 1350° C. for 4 hours. The thus obtained semi-sintered mass of the powder blend was crushed in a mortar and then disintegrated in a ball mill with water to give a powder which was washed with 1000 ml of water, filtrated and dried by heating at 100° C. for 6 hours. The gadolinium oxide powder after the above described treatment had a specific surface area smaller than 0.5 $m^2/g$.

An aqueous slurry was prepared by thoroughly dispersing the above prepared gadolinium oxide powder after the surface treatment in a half amount of water. The slurry as prepared had a viscosity of 30 centipoise, which value could persistently be maintained over 60 days or even longer.

For comparison, 100 g of the same gadolinium oxide powder before the surface treatment were dispersed by thoroughly agitating in 100 g of water to give an aqueous slurry, which was found to have been gelled after 2 days of standing as such.

EXAMPLE 4

A powder blend was prepared by using a pestle and mortar from 100 g of an erbium oxide powder, 2.0 g of barium oxide and 0.1 g of boron oxide and calcined in an alumina crucible by heating in air at 1350° C. for 4 hours. The thus obtained semi-sintered mass of the powder blend was crushed in a mortar and then disintegrated in a ball mill with water to give a powder which was washed with 1000 ml of water, filtrated and dried by heating at 100° C. for 6 hours. The erbium oxide powder after the above described treatment had a specific surface area of 1.4 $m^2/g$.

An aqueous slurry was prepared by thoroughly dispersing the above prepared erbium oxide powder after the surface treatment in a half amount of water. The slurry as prepared had a viscosity of 20 centipoise, which value could persistently be maintained over 60 days or even longer.

For comparison, 200 g of the same erbium oxide powder before the surface treatment were dispersed by thoroughly agitating in 100 g of water to give an aqueous slurry, which was found to have been gelled after 3 days of standing as such. Similar results to the above were obtained when the erbium oxide powder was replaced with the same amount of a ytterbium oxide powder except that gelation of the slurry was found after 4 days of standing.

COMPARATIVE EXAMPLE

The experimental procedure was substantially the same as in Example 1 except that the calcination temperature was 1100° C. instead of 1300° C. The powder prepared by the wet-process disintegration of the semi-sintered mass obtained by the calcination had a specific surface area of 3.2 $m^2/g$.

An aqueous slurry was prepared by dispersing 200 g of the thus prepared yttrium oxide powder after the surface treatment by thoroughly agitating in 100 g of water but the slurry was found to have been gelled after 8 days of standing.

What is claimed is:

1. A green ceramic body shaped from an aqueous slurry of a rare earth oxide powder of which each of the particles has a coating of a flux composition consisting of (1) a borate of an alkali metal or alkaline earth metal element or (2) a combination of a boron oxide constituent and an oxide, carbonate, or chloride of an alkali metal or alkaline earth metal element, the powder having a specific surface area not exceeding 3 $m^2/g$.

2. The green ceramic body as claimed in claim 1 in which the amount of the coating layer on the particles of the rare earth oxide is in the range from 0.1 to 5% by weight based on the amount of the uncoated rare earth oxide particles.

3. The green ceramic body as claimed in claim 1 in which the rare earth oxide powder of which each of the particles has a coating layer of a flux composition is prepared by a method comprising the steps of:
 (a) blending a rare earth oxide powder with a flux composition which is (1) a borate of an alkali metal or alkaline earth metal element or (2) a combination of a boron oxide constituent and an oxide, carbonate or chloride of an alkali metal or alkaline earth metal element in an amount in the range from 0.1 to 5% by weight based on the amount of the rare earth oxide powder to give a uniform blend;

(b) calcining the blend at a temperature in the range from 1200 to 1400° C. for a length of time in the range from 0.5 to 24 hours;

(c) cooling the calcined blend to room temperature to give a semi-sintered mass;

(d) disintegrating the semi-sintered mass into a powdery form having a specific surface area not exceeding 3 $m^2/g$; and (e) subjecting the powder to a leaching treatment with water to remove any water-soluble fraction of the flux composition.

* * * * *